(12) United States Patent
Holder et al.

(10) Patent No.: US 7,924,822 B2
(45) Date of Patent: Apr. 12, 2011

(54) METHOD AND APPARATUS FOR ENHANCED INTERNET TELEPHONY

(75) Inventors: Louis Holder, Princeton Jct., NJ (US); Jeffrey Citron, Edison, NJ (US)

(73) Assignee: Vonage Network LLC, Holmdel, NJ (US)

( * ) Notice: Subject to any disclaimer, the term of this patent is extended or adjusted under 35 U.S.C. 154(b) by 204 days.

(21) Appl. No.: 12/071,004

(22) Filed: Feb. 14, 2008

(65) Prior Publication Data
US 2008/0183892 A1    Jul. 31, 2008

Related U.S. Application Data

(62) Division of application No. 10/684,593, filed on Oct. 15, 2003, now Pat. No. 7,417,981.

(51) Int. Cl.
*H04L 12/66* (2006.01)
(52) U.S. Cl. ........................................................ 370/352
(58) Field of Classification Search .......... 370/351–353, 370/392, 389, 401, 466, 260, 217, 342, 320, 370/335, 493, 360; 709/245, 240, 228, 203, 709/204; 379/93, 88; 725/131; 455/437, 455/435, 418, 456, 404; 713/171
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,782,485 A | 11/1988 | Gollub | |
| 4,935,956 A | 6/1990 | Hellwarth et al. | |
| 5,018,136 A | 5/1991 | Gollub | |
| 5,444,707 A | 8/1995 | Cerna et al. | |
| 5,452,289 A | 9/1995 | Sharma et al. | |
| 5,526,353 A | 6/1996 | Henley et al. | |
| 5,623,490 A | 4/1997 | Richter et al. | |
| 5,966,427 A | 10/1999 | Shaffer et al. | |
| 5,995,491 A | 11/1999 | Richter et al. | |
| 6,014,437 A | 1/2000 | Acker et al. | |
| 6,067,516 A | 5/2000 | Levay et al. | |
| 6,084,956 A | 7/2000 | Turner et al. | |
| 6,092,115 A | 7/2000 | Choudhury et al. | |
| 6,097,804 A | 8/2000 | Gilbert et al. | |
| 6,104,706 A | 8/2000 | Richter et al. | |
| 6,115,460 A | 9/2000 | Crowe et al. | |
| 6,115,468 A | 9/2000 | De Nicolo | |
| 6,118,860 A | 9/2000 | Hillson et al. | |
| 6,122,364 A | 9/2000 | Petrunka et al. | |

(Continued)

FOREIGN PATENT DOCUMENTS

WO        98/04990 A1    9/1998

(Continued)

OTHER PUBLICATIONS

Paulsamy V et al., "Network Convergence and the NAT/Firewall Problems", Proceedings of the 37th Hawaii International Conference on System Sciences (HICSS'03). IEEE, Jan. 6, 2003.

(Continued)

*Primary Examiner* — Pankaj Kumar
*Assistant Examiner* — Prenell P Jones
(74) *Attorney, Agent, or Firm* — Duane Morris LLP

(57) ABSTRACT

A method and apparatus for enhanced Internet telephony ensures that communication between a source and destination is not interrupted by common network address translation. According to one aspect of the invention, communication may continue through a router that employs network address translation.

21 Claims, 3 Drawing Sheets

U.S. PATENT DOCUMENTS

| | | | |
|---|---|---|---|
| 6,128,379 | A | 10/2000 | Smyk |
| 6,137,869 | A | 10/2000 | Voit et al. |
| 6,138,072 | A | 10/2000 | Nagai |
| 6,167,042 | A | 12/2000 | Garland et al. |
| 6,169,741 | B1 | 1/2001 | LeMaire et al. |
| 6,175,565 | B1 | 1/2001 | McKinnon et al. |
| 6,178,239 | B1 | 1/2001 | Kishinsky et al. |
| 6,185,285 | B1 | 2/2001 | Relyea et al. |
| 6,188,762 | B1 | 2/2001 | Shooster |
| 6,195,425 | B1 | 2/2001 | Farris |
| 6,226,286 | B1 | 5/2001 | Danne et al. |
| 6,226,361 | B1 | 5/2001 | Koyama |
| 6,243,443 | B1 | 6/2001 | Low et al. |
| 6,249,576 | B1 | 6/2001 | Sassin et al. |
| 6,266,405 | B1 | 7/2001 | Madour et al. |
| 6,272,126 | B1 | 8/2001 | Strauss et al. |
| 6,282,281 | B1 | 8/2001 | Low |
| 6,282,284 | B1 | 8/2001 | Dezonno et al. |
| 6,292,553 | B1 | 9/2001 | Fellingham et al. |
| 6,298,064 | B1 | 10/2001 | Christie |
| 6,304,572 | B1 | 10/2001 | Christie |
| 6,304,637 | B1 | 10/2001 | Mirashrafi et al. |
| 6,304,653 | B1 | 10/2001 | O'Neil et al. |
| 6,310,941 | B1 | 10/2001 | Crutcher et al. |
| 6,311,182 | B1 | 10/2001 | Colbath et al. |
| 6,320,951 | B1 | 11/2001 | Shtivelman et al. |
| 6,327,572 | B1 | 12/2001 | Morton et al. |
| 6,330,317 | B1 | 12/2001 | Garfinkel |
| 6,337,889 | B1 | 1/2002 | Mita et al. |
| 6,337,899 | B1 | 1/2002 | Alcendor et al. |
| 6,343,115 | B1 | 1/2002 | Foladare et al. |
| 6,343,143 | B1 | 1/2002 | Guillemaud et al. |
| 6,349,132 | B1 | 2/2002 | Wesemann et al. |
| 6,351,464 | B1 | 2/2002 | Galvin et al. |
| 6,351,526 | B1 | 2/2002 | Shaffer et al. |
| 6,366,577 | B1 | 4/2002 | Donovan |
| 6,366,661 | B1 | 4/2002 | Devillier et al. |
| 6,373,836 | B1 | 4/2002 | Deryugin et al. |
| 6,373,936 | B1 | 4/2002 | Raniere et al. |
| 6,373,938 | B1 | 4/2002 | Palacios et al. |
| 6,385,209 | B1 | 5/2002 | Skirmont et al. |
| 6,389,119 | B1 | 5/2002 | McBride |
| 6,393,476 | B1 | 5/2002 | Barnhouse et al. |
| 6,400,820 | B1 | 6/2002 | Edwards et al. |
| 6,404,746 | B1 | 6/2002 | Cave et al. |
| 6,404,882 | B2 | 6/2002 | Fellner et al. |
| 6,404,884 | B1 | 6/2002 | Marwell et al. |
| 6,408,062 | B1 | 6/2002 | Cave |
| 6,408,065 | B1 | 6/2002 | O'Neil et al. |
| 6,411,697 | B1 | 6/2002 | Creamer et al. |
| 6,411,704 | B1 | 6/2002 | Pelletier et al. |
| 6,415,269 | B1 | 7/2002 | Dinwoodie |
| 6,421,437 | B1 | 7/2002 | Slutsman |
| 6,424,707 | B1 | 7/2002 | Chatterjee |
| 6,430,175 | B1 | 8/2002 | Echols et al. |
| 6,430,176 | B1 | 8/2002 | Christie, IV |
| 6,430,289 | B1 | 8/2002 | Liffick |
| 6,434,143 | B1 | 8/2002 | Donovan |
| 6,442,242 | B1 | 8/2002 | McAllister et al. |
| 6,446,127 | B1 | 9/2002 | Schuster et al. |
| 6,452,932 | B1 | 9/2002 | Christie |
| 6,456,618 | B2 | 9/2002 | Kozdon et al. |
| 6,463,052 | B1 | 10/2002 | Christie |
| 6,466,570 | B1 | 10/2002 | Low et al. |
| 6,470,010 | B1 | 10/2002 | Szviatovszki et al. |
| 6,473,429 | B1 | 10/2002 | Christie |
| 6,480,484 | B2 | 11/2002 | Morton |
| 6,480,581 | B1 | 11/2002 | Wu et al. |
| 6,487,200 | B1 | 11/2002 | Fraser |
| 6,493,337 | B1 | 12/2002 | Stevenson, III |
| 6,493,437 | B1 | 12/2002 | Olshansky |
| 6,496,477 | B1 | 12/2002 | Perkins et al. |
| 6,504,921 | B2 | 1/2003 | Kotik et al. |
| 6,510,219 | B1 | 1/2003 | Wellard et al. |
| 6,519,232 | B1 | 2/2003 | Becher |
| 6,519,333 | B1 | 2/2003 | Malik |
| 6,539,077 | B1 | 3/2003 | Ranalli et al. |
| 6,542,589 | B1 | 4/2003 | Baskin |
| 6,553,023 | B1 | 4/2003 | Yamamiya et al. |
| 6,557,712 | B2 | 5/2003 | Gruber et al. |
| 6,563,793 | B1 | 5/2003 | Golden et al. |
| 6,564,261 | B1 | 5/2003 | Gudjonsson et al. |
| 6,567,398 | B1 | 5/2003 | Aravamudan et al. |
| 6,567,419 | B1 | 5/2003 | Yarlagadda |
| 6,571,212 | B1 | 5/2003 | Dent |
| 6,577,712 | B2 | 6/2003 | Larsson et al. |
| 6,584,094 | B2 | 6/2003 | Maroulis et al. |
| 6,584,098 | B1 | 6/2003 | Dutnall |
| 6,584,186 | B1 | 6/2003 | Aravamudan et al. |
| 6,584,510 | B2 | 6/2003 | Anttila |
| 6,587,836 | B1 | 7/2003 | Ahlberg et al. |
| 6,597,685 | B2 | 7/2003 | Miloslavsky et al. |
| 6,614,786 | B1 | 9/2003 | Byers |
| 6,614,899 | B1 | 9/2003 | Sollee et al. |
| 6,621,899 | B2 | 9/2003 | Dezonno et al. |
| 6,628,760 | B2 | 9/2003 | Mirashrafi et al. |
| 6,633,561 | B2 | 10/2003 | Christie |
| 6,650,890 | B1 | 11/2003 | Irlam et al. |
| 6,665,294 | B2 | 12/2003 | Christie |
| 6,665,389 | B1 | 12/2003 | Haste, III |
| 6,665,392 | B1 | 12/2003 | Wellner et al. |
| 6,668,055 | B2 | 12/2003 | Marwell et al. |
| 6,681,252 | B1 | 1/2004 | Schuster et al. |
| 6,690,780 | B2 | 2/2004 | Kotik et al. |
| 6,694,007 | B2 | 2/2004 | Lang et al. |
| 6,697,475 | B1 | 2/2004 | MeLampy et al. |
| 6,707,811 | B2 | 3/2004 | Greenberg et al. |
| 6,707,906 | B1 | 3/2004 | Ben-Chanoch |
| 6,711,160 | B2 | 3/2004 | Chan et al. |
| 6,714,988 | B2 | 3/2004 | Takemoto et al. |
| 6,718,031 | B2 | 4/2004 | Fellner et al. |
| 6,724,755 | B1 | 4/2004 | Kim |
| 6,731,630 | B1 | 5/2004 | Schuster et al. |
| 6,731,642 | B1 | 5/2004 | Borella et al. |
| 6,731,741 | B1 | 5/2004 | Fourcand et al. |
| 6,741,586 | B1 | 5/2004 | Schuster et al. |
| 6,748,057 | B2 | 6/2004 | Ranalli et al. |
| 6,760,429 | B1 | 7/2004 | Hung et al. |
| 6,763,226 | B1 | 7/2004 | McZeal, Jr. |
| 6,765,931 | B1 | 7/2004 | Rabenko et al. |
| 6,769,020 | B2 | 7/2004 | Miyazaki et al. |
| 6,771,637 | B1 | 8/2004 | Suzuki et al. |
| 6,775,368 | B1 | 8/2004 | Lee et al. |
| 6,778,661 | B1 | 8/2004 | Yumoto et al. |
| 6,781,982 | B1 * | 8/2004 | Borella et al. ............... 370/352 |
| 6,798,873 | B2 | 9/2004 | Vardi et al. |
| 6,819,752 | B2 | 11/2004 | Raniere et al. |
| 6,822,945 | B2 | 11/2004 | Petrovykh |
| 6,822,957 | B1 * | 11/2004 | Schuster et al. ............... 370/389 |
| 6,839,359 | B2 | 1/2005 | Skirmont et al. |
| 6,839,421 | B2 | 1/2005 | Esparza et al. |
| 6,870,845 | B1 | 3/2005 | Bellovin et al. |
| 6,892,230 | B1 | 5/2005 | Gu et al. |
| 7,035,289 | B2 * | 4/2006 | Devine et al. ............... 370/493 |
| 7,408,928 | B2 * | 8/2008 | Bradd et al. ............... 370/389 |
| 2001/0005412 | A1 | 6/2001 | Light et al. |
| 2001/0005415 | A1 | 6/2001 | Grunsted et al. |
| 2001/0014919 | A1 | 8/2001 | Tzirin |
| 2002/0007391 | A1 | 1/2002 | Suzuki |
| 2002/0034284 | A1 | 3/2002 | Kang ...................... 379/100.06 |
| 2002/0049815 | A1 | 4/2002 | Dattatri ...................... 709/206 |
| 2002/0049860 | A1 | 4/2002 | Koistinen |
| 2002/0055879 | A1 | 5/2002 | Wengrovitz et al. |
| 2002/0071429 | A1 | 6/2002 | Donovan ...................... 370/352 |
| 2002/0085535 | A1 | 7/2002 | Williams |
| 2002/0095516 | A1 | 7/2002 | Nada |
| 2002/0112073 | A1 | 8/2002 | Mclampy et al. |
| 2002/0114430 | A1 | 8/2002 | Murata |
| 2002/0120760 | A1 | 8/2002 | Kimchi et al. ............... 709/230 |
| 2002/0126818 | A1 | 9/2002 | Cai et al. |
| 2002/0129131 | A1 | 9/2002 | Yamashita |
| 2002/0150083 | A1 | 10/2002 | Fangman et al. |
| 2002/0176403 | A1 | 11/2002 | Radian ...................... 370/352 |
| 2002/0191596 | A1 | 12/2002 | Moyano et al. ............... 370/352 |
| 2002/0191635 | A1 | 12/2002 | Chow et al. ............... 370/463 |
| 2003/0002654 | A1 | 1/2003 | Torba ...................... 379/266.08 |
| 2003/0005280 | A1 | 1/2003 | Bobde et al. ............... 713/150 |

| | | |
|---|---|---|
| 2003/0041132 A1 | 2/2003 | Lim et al. |
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0110292 A1* | 6/2003 | Takeda et al. ............... 709/245 |
| 2003/0118002 A1* | 6/2003 | Bradd et al. ................. 370/352 |
| 2003/0120502 A1* | 6/2003 | Robb et al. ........................ 705/1 |
| 2003/0162526 A1 | 8/2003 | Clarisse et al. |
| 2003/0174695 A1 | 9/2003 | Lautenschlager et al. .... 370/352 |
| 2003/0182553 A1* | 9/2003 | Medvinsky ................. 713/171 |
| 2003/0202504 A1 | 10/2003 | Dhara et al. |
| 2003/0212795 A1 | 11/2003 | Harris et al. ................. 709/227 |
| 2004/0008724 A1* | 1/2004 | Devine et al. ................ 370/466 |
| 2004/0028025 A1 | 2/2004 | Chang |
| 2004/0028207 A1 | 2/2004 | Kato |
| 2004/0039938 A1 | 2/2004 | Katz et al. .................... 713/201 |
| 2004/0057415 A1 | 3/2004 | Colson et al. |
| 2004/0114575 A1 | 6/2004 | Morita et al. |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0246991 A1* | 12/2004 | Tsuzuki et al. ............... 370/466 |
| 2004/0252683 A1 | 12/2004 | Kennedy et al. ............. 370/389 |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018651 A1* | 1/2005 | Yan et al. ..................... 370/352 |
| 2005/0018659 A1 | 1/2005 | Gallant et al. ................ 370/352 |
| 2005/0064862 A1 | 3/2005 | Castrogiovanni et al. .... 455/420 |
| 2006/0209795 A1* | 9/2006 | Chow et al. .................. 370/352 |
| 2007/0133516 A1* | 6/2007 | Stein ............................. 370/352 |
| 2009/0150567 A1* | 6/2009 | Takeda et al. ................ 709/245 |

FOREIGN PATENT DOCUMENTS

WO          02/103460 A2        12/2002

OTHER PUBLICATIONS

Johnston, A., et al. "SIP Call Flow Examples" IETF Standard-Working-Draft, Internet Engineering Task Force (IETF), CH, vol. sip, No. 4 Apr. 2001, pp. 1-72, XP015027711, ISSN: 000-0004.

Rosenberg et al., "NAT Friendly SIP," Internet Engineering Task Force (Jul. 20, 2001), available at http://tools.ietf.org/ html/draft-rosenberg-sip-entfw-02 (last accessed Aug. 27, 2007).

Rosenberg, J., et al. "STUN—Simple Traversal of UDP Through Network Address Translators" IETF Standard-Working-Draft, Internet Engineering Task Force (IETF), CH, vol, midcom, No. 3, Oct. 14, 2002, XP015002624, ISSN: 0000-0004.

Mahy, R., et al. "STUN—aware NAT draft-simu-midcom-stun-aware-nat-00.txt" IETF Standard-Working-Draft, Internet Engineering Task Force (IETF), CH, Apr. 10, 2002, XP015005296, ISSN: 0000-0004.

Mahy, R., et al. "Pre-Midcom Requirements for Traversal of NATs for traffic not supported by STUN draft-mahy-midcom-premidcom-relay-reqs-00.txt" IETF Standard-Working-Draft, Internet Engineering Taskforce, IETF, CH, Feb. 2003, XP015004271, ISSN: 0000-0004.

Srisuresh et al., "Middlebox Communication Architecture and Framework," FRC 3303, Internet Engineering Task Force (Aug. 2002), available at http://www.ietf.org/rfc/rfc3303.txt (last accessed Aug. 27, 2007).

Fineberg, V,; A practical architecture for implementing end-to-end QoS in an IP network Communications Magazine, IEEE vol. 40, Issue 1, Jan. 2002 pp. 122-130.

Melvin, H,; Murphy, L,; Time synchronization for VoIP quality of service Internet Computing, IEEE vol. 6, Issue 3, May-Jun. 2002 pp. 57-63.

* cited by examiner

METHOD AND APPARATUS FOR ENHANCED INTERNET TELEPHONY

The present application is a divisional application that claims priority benefit of U.S. patent application Ser. No. 10/684,593 filed Oct. 15, 2003, now U.S. Pat. No. 7,417,981 entitled "Method and Apparatus for Enhanced Internet Telephony" the disclosure of which is hereby incorporated by reference.

BACKGROUND OF THE INVENTION

Today, most common residential broadband deployments are delivered via either cable or DSL modem. Such broadband deployment typically provides customers with a single Ethernet port that grants one public IP address to a single computer device. Given this situation, customers are restricted to using only one computer, and must purchase a router if they desire to share the broadband connection to access, for example, the Internet between more than one of the customer's computer devices.

To transport media and telephone signaling, customers commonly use a Multi Media Terminal Adapter (MTA) coupled between their source device (e.g., a computer or telephone) and their broadband connection. One example of a common Media Terminal Adapter is the Cisco ATA 186 Analog to Telephone Adapter (ATA) manufactured by Cisco Systems, Inc. of San Jose Calif. In the case of Internet telephony, the Media Terminal Adapter operates as a handset to Ethernet adapter that converts traditional telephone analog signals into Internet packets. The packets are then sent using, for example, a standard protocol such as Session Initiation Protocol (SIP) on route towards their destination.

FIG. 1 is a schematic representation of an example user Internet Telephony environment. In FIG. 1, a cable modem 10 provides access to the Internet 20. In the FIG. 1 example, the user employs an intermediate communication point, e.g., router 30 to provide multiple devices access to the Internet 20. The router 30 assigns respective private dynamic IP addresses to the Media Terminal Adapter 40 and to the computer 50. As shown in the FIG. 1 example, the Media Terminal Adapter 40 is coupled to a common telephone handset 60. The Media Terminal Adapter 40 receives signals from the handset 60, creates packets and sends data packets to the Router 30, which in turn sends them to the cable modem 10 and eventually to the Internet 20.

A major drawback of the above typical environment is the difficulty in accommodating the Network Address Translation (NAT) that is typically implemented by the router 30. As is commonly understood, a Dynamic Host Configuration Protocol server running on the router 30 assigns private dynamic IP addresses to the Media Terminal Adapter 40 and computer 50; thus effecting Network Address Translation (NAT).

When a user wishes to initiate a call and activates the telephone handset 60, the handset sends signals to the Media Terminal Adapter 40. The Media Terminal Adapter 40 then begins the communication/registration process with an Internet telephone service provider. The communication between the Media Terminal Adapter 40 and a server of the Internet telephone service provider employs a standard protocol such as Session Initiation Protocol. But, the router 30 performs the Network Address Translation on a timed basis. As is commonly known, typical routers used in home environments assign private IP addresses to devices connected to the router. But, those addresses are valid only for a limited time. Thus, after the limited time expires, the private address is no longer assigned to a given device, such as the Media Terminal Adapter 40. As a result, the SIP messages sent from Internet telephone service provider's server are not passed by the router 30 to the Media Terminal Adapter 40. Consequently, the Media Terminal Adapter 40 can send SIP messages, but is not able to receive packets from the Internet Telephone service provider's server due to the router 30 losing the originating outbound port and making communication to an MTA located behind a router impossible.

FIG. 2 is a schematic representation of an example environment that addresses the issue of router 30 losing an outbound port during an Internet telephone connection. In the FIG. 2 example, at the Internet telephone service provider, a destination, e.g., a pre-proxy server 70, receives messages from the router 30. Pre-proxy server 70 records the private IP address of the Media Terminal Adapter 40 during, for example, the SIP registration process. It also records the network address translation communication port assigned by the router 30 to the Media Terminal Adapter 40 to and from which it will send and receive messages, such as SIP messages. Upon registration, the Media Terminal Adapter 40 passes fields used to communicate with the pre-proxy server 70. Examples of fields, that can be passed include, for example, the private IP address of the Media Terminal Adapter 40, the public IP address of the router 30, and port information. After the pre-proxy server 70 receives the information from the Media Terminal Adapter 40, the pre-proxy server 70 periodically sends, for example, blank UDP messages to the Media Terminal Adapter 40, which contain the same destination and source address as a typical SIP message would have. Other messages could be used instead of the UDP message. The message used should prompt the Media Terminal Adapter 40 to send a response to the pre-proxy server 70. The pre-proxy server 70 sends, for example, the UDP message to the router 30 using the public IP address of the router 30 and the port information received in the message from the router 30. The pre-proxy server 70 sends, for example, the UDP within the limited time that the router 30 maintains that private address assigned to the Media Terminal Adapter. The router 30 accordingly routes the message to the destination designated in the message from the pre-proxy server 70. The pre-proxy server 70 also maintains the private and public IP addresses of the MTA and rewrites the headers in the actual SIP messages based on this information.

The above solution worked, but it did not solve the network address translation problem for all routers. For example, some routers would close the outbound port if the device behind the router's network address translation did not send an outbound message. Thus, there is a need for a solution to the problem, in Internet telephony, of the network address translation that a router performs as a part of its intended operation.

SUMMARY OF THE INVENTION

It is an object of the present invention to provide a method and apparatus for enhanced Internet telephony that avoids the above drawbacks.

It is another object of the present invention to provide a method and apparatus for enhanced Internet telephony that allows the use of Session Initiated Protocol technology.

It is a further object of the present invention to provide a method and apparatus for enhanced Internet telephony that allows the use of Session Initiated Protocol technology within environments employing network address translation.

It is still another object of the present invention to provide a method and apparatus for enhanced Internet telephony that allows the use of Session Initiated Protocol technology with routers employing network address translation.

To achieve the above and other object, the present invention provides a method for providing enhanced Internet telephony that includes receiving a message from a source at an intermediate point; sending at least a portion of the message from the intermediate point to a destination over the Internet; sending a response to the message from the destination to the intermediate point over the Internet; sending the response from the intermediate point to the source; repeatedly sending other messages from the destination over the Internet to the intermediate point; sending at least a portion of corresponding ones of the other messages from the intermediate point to the source; and sending responses to the portions of the other messages from the source to the intermediate point.

DESCRIPTION OF THE PREFERRED EMBODIMENTS

Figure 1:
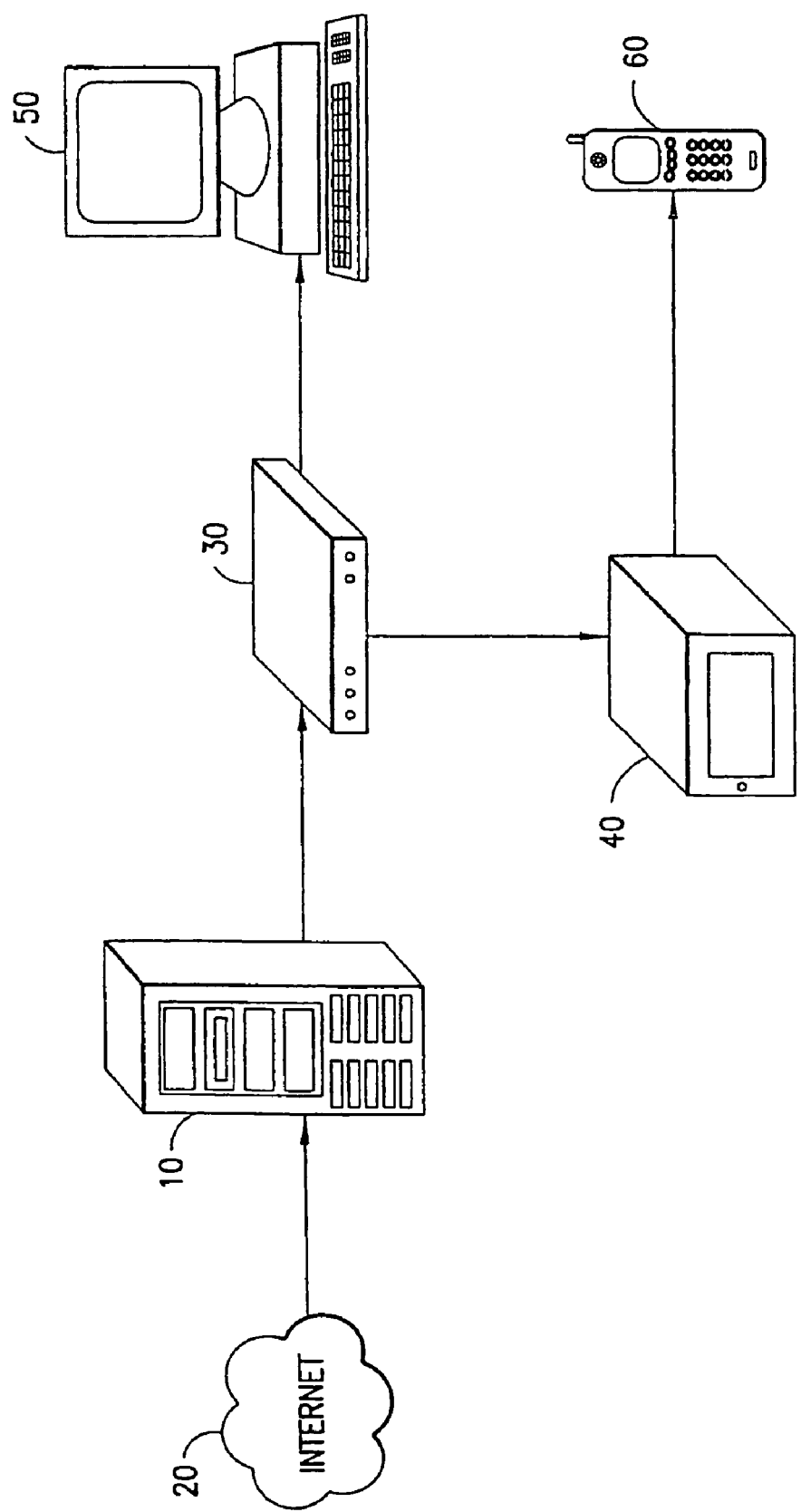
FIG. 1 is a schematic representation of an example user Internet Telephony environment.
Figure 2:
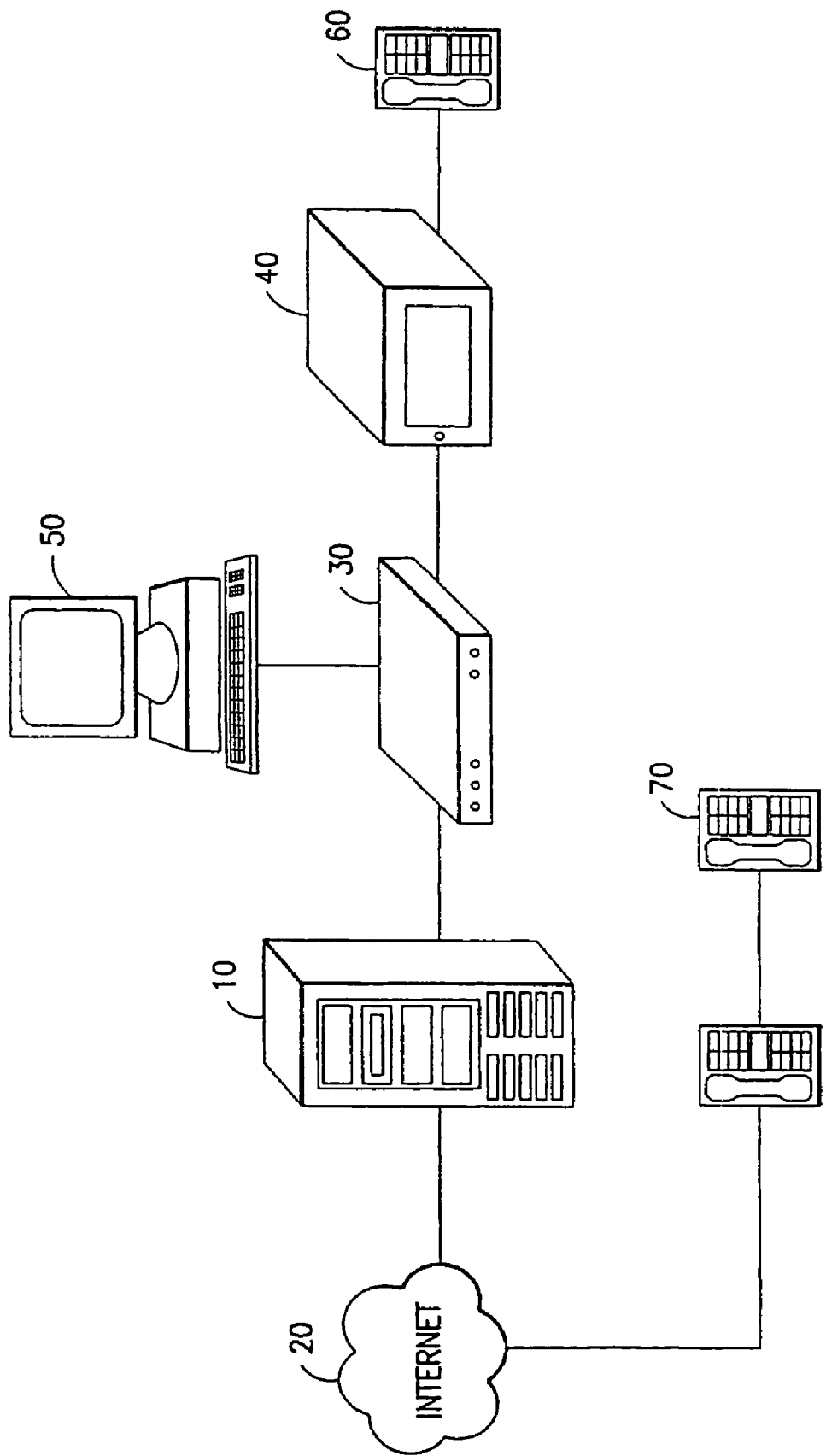
FIG. 2 is a schematic representation of an example environment intended to address the issue of a router losing an outbound port during an Internet telephone connection.
Figure 3:
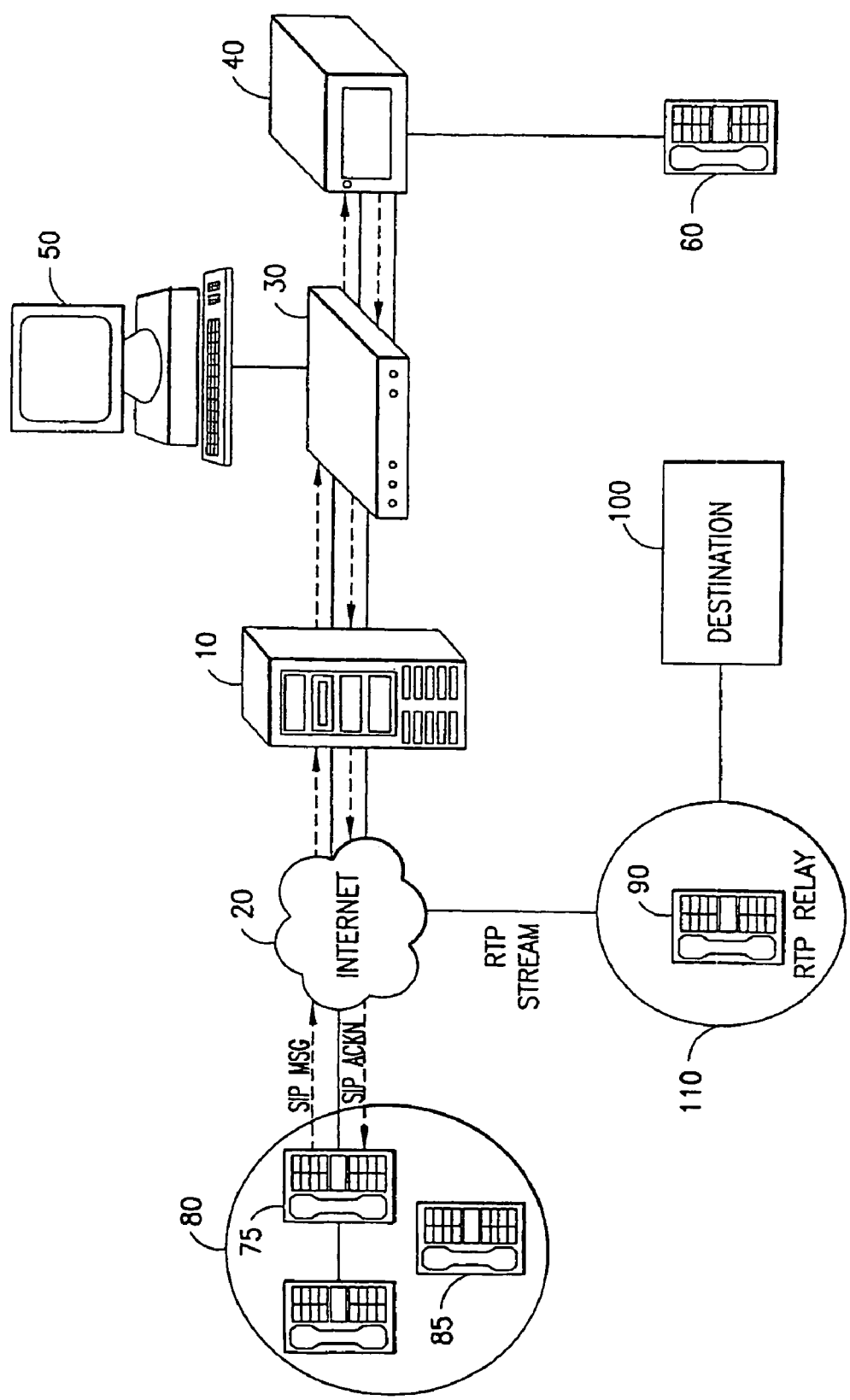
FIG. 3 is a schematic representation of an example environment employing the present invention.

FIG. 3 is a schematic representation of an example environment employing an embodiment of the present invention. In FIG. 3, a user initiates a call using a telephone handset 60. As described above, the media terminal adapter 40 implements standard signaling between itself and an Internet telephony regional data center 80. Once the user has been registered and the destination has provided a SIP acknowledgment of the SIP invite sent by the media terminal adapter 40, communication between the caller 60 and a customer in a destination area 100 proceeds using, for example, Real-time Transport Protocol (RTP) between the caller and a customer in the destination area 100 via the Internet 20 and, for example, a RTP relay 90 in Internet telephony point-of-presence 110 in the destination area 100.

However, with the call set up as described above, the router 30 may close the outbound port after a timeout period. As a result, voice data from the customer in the destination area 110 will not reach the telephone handset 60 behind router 30. To avoid the router 30 timing out and closing the outbound port, an embodiment of the present invention causes the media terminal adapter 40 to send an outbound message to the Internet telephony regional data center 80. One way of accomplishing this is to have the pre-proxy server 75 periodically send an empty SIP notify message to the media terminal adapter 40. The media terminal adapter 40 responds to this notify message in accordance with SIP standards by, for example sending an acknowledgment message. The sending of a message by the media terminal adapter 40 causes the router 30 to keep the outbound port open by, for example restarting the router's timeout period.

Referring to the exemplary embodiment shown in FIG. 3, the Internet telephony regional data center 80 has the pre-proxy server 75 separated from the RTP relay 85. While this separation is not necessary to the present invention, in some environments, it allows additional functionality to be more easily added to the pre-proxy server 75. An example of such additional functionality is the dynamic allocation of the RTP relay 85. The pre-proxy server 75 can allocate the closest RTP relay between the two calling parties. That allocation enables the ability to decrease latency and travel time of the RTP stream. Also as shown in FIG. 3, with the exemplary embodiment, only SIP messages get routed to the Internet telephony regional data center 80. The RTP stream need not travel to the data center, and depending upon the location of the caller and the destination area 100, can travel within a limited geographic area. For example, the telephone handset could be located in California, and the Internet telephony regional data center 80 could be located in New Jersey. If the destination area 100 is also in California, the Internet telephony point of presence in the destination area 90 would be allocated by the pre-proxy server 75 to also be in California. Thus, as noted above, the RTP stream would remain in California; tending to reduce latency and travel time of the RTP stream.

In the above, the pre-proxy server 75 is shown and discussed as a separate computer. This is for convenience of discussion, for purposes of practicing the invention, it does not need to be separate. Instead, the discussed functions that typically would be implemented in a pre-proxy server can be implemented in a computer that is also functioning as a server.

The invention claimed is:

1. An internet telephony system comprising an internet telephony server configured to process a SIP signaling message to setup a communication of streaming packets with a media terminal adapter on a first network, the internet telephony server being on a second network and further configured to replace a first network address of the media terminal adapter in one or more fields of the SIP signaling message with a second network address to accommodate the first and second networks being separated by a router performing network address translation between corresponding network addresses on the first and second networks, wherein the second network address was received from the router.

2. The internet telephony system of claim 1, wherein the internet telephony server is configured to replace the first network address of the first network for the media terminal adapter in one or more fields of the SIP signaling message with a corresponding second network address of the second network for the media terminal adapter.

3. The internet telephony system of claim 1, wherein the first network is a private network.

4. The internet telephony system of claim 1, wherein the second network is a public network.

5. The internet telephony system of claim 1, wherein the internet telephony server is further configured to store a network address of the first network for the media terminal adapter.

6. The internet telephony system of claim 1, wherein the internet telephony server is further configured to store the second network address corresponding to the media terminal adapter.

7. The internet telephony system of claim 1, wherein the SIP signaling message is a SIP Invite.

8. The internet telephony system of claim 1, wherein the internet telephony server is further configured as a pre-proxy server.

9. The internet telephony system of claim 1, wherein the streaming packets are Real Time Transport Protocol (RTP) packets.

10. A method of providing internet telephony comprising:
receiving at an internet telephony server on a second network a Session Initiation Protocol (SIP) signaling message for setting up a communication of streaming packets with a media terminal adapter on a first network;

replacing a network address of the media terminal adapter in one or more fields of the SIP signaling message with a different network address to accommodate the first and second networks being separated by a router performing network address translation between corresponding network addresses on the first and second networks, wherein the different network address is received from the router.

11. The method of providing interne telephony of claim 10, wherein a network address of the first network for the media terminal adapter in one or more fields of the SIP signaling message is replaced with a corresponding network address of the second network for the media terminal adapter.

12. The method of providing internet telephony of claim 10, wherein the first network is a private network.

13. The method of providing internet telephony of claim 10, wherein the second network is a public network.

14. The method of providing internet telephony of claim 10 further comprising the step of storing a network address of the first network for the media terminal adapter.

15. The method of providing internet telephony of claim 10 further comprising the step of storing the different network address of the second network corresponding to the media terminal adapter.

16. The method of providing internet telephony of claim 10, wherein the SIP signaling message is a SIP Invite.

17. The method of providing internet telephony of claim 10, wherein the internet telephony server is configured as a pre-proxy server.

18. The method of providing internet telephony of claim 10, wherein the streaming packets are Real Time Transport Protocol (RTP) packets.

19. The system of claim 1, wherein the field is a SDP field.

20. The method of claim 10, wherein the field is a SDP field.

21. An internet system comprising:
   an internet telephony server configured to receive and process a SIP signaling message to setup a communication of streaming packets with a media terminal adapter on a first network,
   the internet telephony server being on a second network and further configured to replace a first network address of the media terminal adapter in one or more fields of the SIP signaling message with a second network address; and,
   a NAT router separating the first network from the second network and configured to provide the second network address to the internet telephony server via the SIP signaling message.

* * * * *